(12) United States Patent
Cheng et al.

(10) Patent No.: US 10,564,781 B2
(45) Date of Patent: Feb. 18, 2020

(54) TOUCH DISPLAY SCREEN AND PREPARATION METHOD, DISPLAY APPARATUS AND DRIVE METHOD THEREFOR

(71) Applicant: BOE Technology Group Co., Ltd., Beijing (CN)

(72) Inventors: Hongfei Cheng, Beijing (CN); Xin Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/760,501

(22) PCT Filed: Jun. 28, 2017

(86) PCT No.: PCT/CN2017/090530
§ 371 (c)(1),
(2) Date: Mar. 15, 2018

(87) PCT Pub. No.: WO2018/014707
PCT Pub. Date: Jan. 25, 2018

(65) Prior Publication Data
US 2018/0275791 A1     Sep. 27, 2018

(30) Foreign Application Priority Data
Jul. 18, 2016    (CN) .......................... 2016 1 0565811

(51) Int. Cl.
*G06F 3/044*     (2006.01)
*C09K 19/12*     (2006.01)
(Continued)

(52) U.S. Cl.
CPC .............. *G06F 3/044* (2013.01); *C09K 19/12* (2013.01); *C09K 19/22* (2013.01); *C09K 19/26* (2013.01);
(Continued)

(58) Field of Classification Search
CPC combination set(s) only.
See application file for complete search history.

(56) References Cited

U.S. PATENT DOCUMENTS 9,470,928 B2 * 10/2016 Kim .................... C09K 19/3098
2007/0085838 A1 * 4/2007 Ricks .................... G06F 3/0412
345/173
(Continued)

FOREIGN PATENT DOCUMENTS

CN       101424820 A    5/2009
CN       102464983 A    5/2012
(Continued)

OTHER PUBLICATIONS

Sep. 30, 2017—(WO) International Search Report and Written Opinion Application PCT/CN2017/090530 with English Translation.

*Primary Examiner* — Deeprose Subedi
(74) *Attorney, Agent, or Firm* — Banner & Witcoff, Ltd.

(57) ABSTRACT

A touch display screen and a preparation method, display apparatus and drive method therefor. The touch display screen includes: a first substrate and a second substrate arranged opposite each other; a first electrode and a second electrode arranged between the first substrate and the second substrate and capable of generating a horizontal electric field when in a powered-up state; a liquid crystal filled between the first substrate and the second substrate; and a touch sensing electrode provided at an outer side or an inner side of the second substrate. The liquid crystal includes a nematic phase liquid crystal and a long-chain compound dispersed in the nematic phase liquid crystal and enabling the nematic phase liquid crystal to be in a scattered state.

19 Claims, 3 Drawing Sheets

(51) Int. Cl.
*C09K 19/22* (2006.01)
*C09K 19/26* (2006.01)
*C09K 19/30* (2006.01)
*C09K 19/54* (2006.01)

(52) U.S. Cl.
CPC ........ *C09K 19/3068* (2013.01); *C09K 19/544* (2013.01); *C09K 2019/122* (2013.01); *C09K 2019/125* (2013.01)

(56) References Cited

U.S. PATENT DOCUMENTS

| | | |
|---|---|---|
| 2014/0104510 A1 | 4/2014 | Wang et al. |
| 2014/0111473 A1 | 4/2014 | Yang et al. |
| 2014/0253498 A1* | 9/2014 | Suzuki ............... G06F 3/044 345/174 |
| 2017/0269401 A1 | 9/2017 | Qin et al. |

FOREIGN PATENT DOCUMENTS

| | | |
|---|---|---|
| CN | 102937852 A | 2/2013 |
| CN | 102955635 A | 3/2013 |
| CN | 105223725 A | 1/2016 |
| CN | 205983428 U | 2/2017 |
| JP | 2002182228 A | 6/2002 |

\* cited by examiner

TOUCH DISPLAY SCREEN AND PREPARATION METHOD, DISPLAY APPARATUS AND DRIVE METHOD THEREFOR

The application is a U.S. National Phase Entry of International Application No. PCT/CN2017/090530 filed on Jun. 28, 2017, designating the United States of America and claiming priority to Chinese Patent Application No. 201610565811.5, filed Jul. 18, 2016. The present application claims priority to and the benefit of the above-identified applications and the above-identified applications are incorporated by reference herein in their entirety.

TECHNICAL FIELD

Embodiments of the present disclosure relate to a touch display screen and a manufacturing method thereof, a display device and a driving method.

BACKGROUND

A liquid crystal display (LCD) is widely used in application scenarios such as shop windows, vehicles and so on. However, at present, most of the liquid crystal displays are provided with a double-layer polarizer, which may cause technical problems to the liquid crystal displays such as low light transmissivity.

A touch screen is a latest information input device, which has advantages of sensitive touch, multi-touch and so on. It can realize human-computer interaction simply, conveniently and naturally, to provide a brand-new method of multimedia human-computer interaction. According to different composition structures, the touch panel may be divided into: Add on Mode Touch Panel, On Cell Touch Panel and In Cell Touch Panel. According to different structures of the touch screen, there are many solutions for designing the touch screen, and it is common to separately fabricate the display screen and the touch panel of the liquid crystal display device, and a sensing electrode, a driving electrode may also be fabricated in interior, a surface or exterior of the display screen of the liquid crystal display device, and the sensing electrode, the driving electrode are connected with corresponding sensing signal line and driving signal line. If the touch screen is added in current liquid crystal device, lower transmissivity may be caused.

Therefore, design of a touch display screen having a touch function and a display function as well as high transmissivity has increasingly become a demand for a liquid crystal display screen at present stage.

SUMMARY

At least one embodiment of the present disclosure provides a touch display screen, comprises: a first substrate and a second substrate, disposed opposite to each other; a first electrode and a second electrode, disposed between the first substrate and the second substrate, and generating a horizontal electric field in a power-on state; liquid crystal, filled between the first substrate and the second substrate, including nematic liquid crystal and long-chain compounds which are dispersed in the nematic liquid crystal and cause the nematic liquid crystal to form a scattering state; a touch sensing electrode, disposed on an outer side or an inner side of the second substrate.

For example, in the touch display screen provided by at least one embodiment of the present disclosure, long chains of the long-chain compounds are perpendicular to the first substrate.

For example, in the touch display screen provided by at least one embodiment of the present disclosure, the long-chain compound includes a plurality of monomers, the monomer including any one or a combination of:

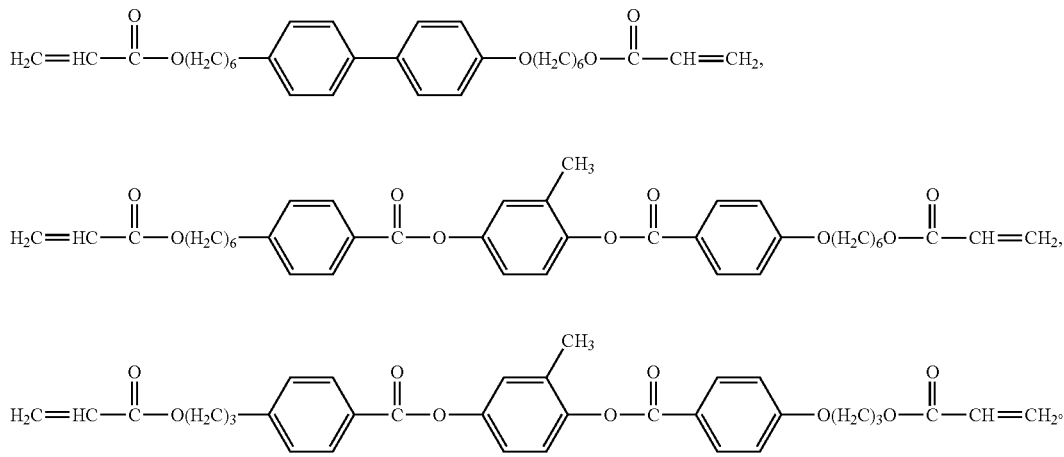

For example, in the touch display screen provided by at least one embodiment of the present disclosure, the long-chain compound includes any one or a combination of:

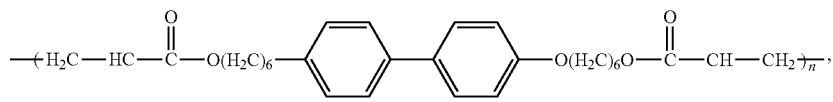

-continued

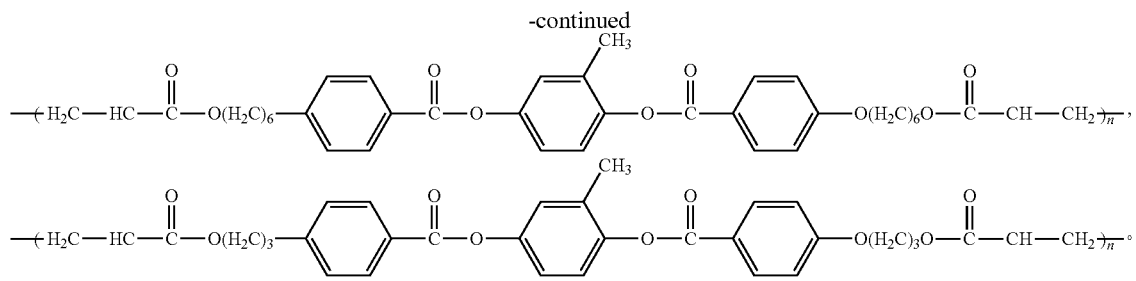

For example, in the touch display screen provided by at least one embodiment of the present disclosure, the nematic liquid crystal is positive liquid crystal.

For example, in the touch display screen provided by at least one embodiment of the present disclosure, the nematic liquid crystal includes any one or a combination of liquid crystal molecules as follows:

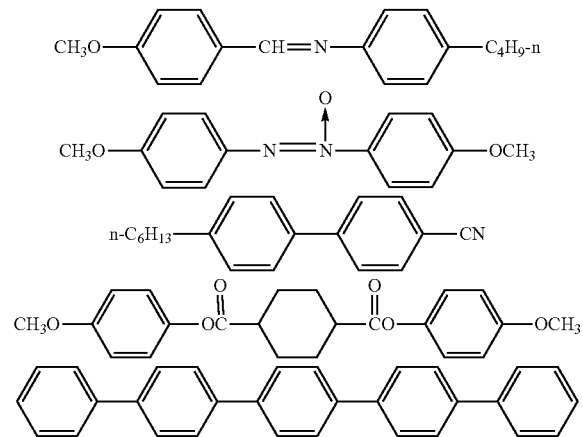

For example, in the touch display screen provided by at least one embodiment of the present disclosure, the first electrode, the second electrode and the touch sensing electrode are all made of a transparent conductive material.

For example, in the touch display screen provided by at least one embodiment of the present disclosure, the first electrode is slit-shaped and the second electrode is slit-shaped or plate-shaped.

For example, in the touch display screen provided by at least one embodiment of the present disclosure, under a case that the first electrode and the second electrode are disposed on a same substrate, an insulating layer is disposed between the first electrode and the second electrode.

For example, in the touch display screen provided by at least one embodiment of the present disclosure, the first electrode and the second electrode are both disposed on an upper surface of the first substrate.

For example, in the touch display screen provided by at least one embodiment of the present disclosure, the first electrode is disposed on an upper surface of the first substrate and the second electrode is disposed on a lower surface of the second substrate.

For example, the touch display screen provided by at least one embodiment of the present disclosure further comprises a display driving circuit and a touch driving circuit, the first electrode being electrically connected with the display driving circuit in a first time period, and electrically connected with the touch driving circuit in a second time period.

For example, in the touch display screen provided by at least one embodiment of the present disclosure, orthogonal projections of the first electrode and the touch sensing electrode on the second substrate at least partially overlap with each other.

For example, in the touch display screen provided by at least one embodiment of the present disclosure, the first electrode and the touch sensing electrode are disposed perpendicular to each other.

For example, the touch display screen provided by at least one embodiment of the present disclosure further comprises a third electrode, wherein, the third electrode is a driving electrode for touching, orthogonal projections of the third electrode and the touch sensing electrode on the first substrate at least partially overlapping with each other.

At least one embodiment of the present disclosure provides a display device, the display device comprises the above any touch display screen.

At least one embodiment of the present disclosure provides a manufacturing method of a touch display screen, the manufacturing method of a touch display screen comprises: providing a first substrate and a second substrate; forming a first electrode and a second electrode on the first substrate and/or the second substrate; oppositely disposing the first substrate and the second substrate to form a liquid crystal cell, and filling liquid crystal in the liquid crystal cell, the liquid crystal including nematic liquid crystal and monomers dispersed in the nematic liquid crystal; irradiating by UV light, to form long chain compounds by polymerizing the monomers.

For example, in the manufacturing method of a touch display screen provided by at least one embodiment of the present disclosure, a touch sensing electrode is formed in an outer side or an inner side of the second substrate.

For example, in the manufacturing method of a touch display screen provided by at least one embodiment of the present disclosure, long chains of the long chain compounds are perpendicular to the first substrate.

For example, the manufacturing method of a touch display screen provided by at least one embodiment of the present disclosure further comprises: forming a third electrode on a lower surface of the second substrate, wherein, the third electrode is a driving electrode for touching, orthogonal projections of the third electrode and the touch sensing electrode on the second substrate at least partially overlapping with each other.

At least one embodiment of the present disclosure provides a driving method of the touch screen, which comprises: dividing a display time of one frame image of the touch display screen into a display period and a touch period, wherein, the first electrode is multiplexed to a common electrode for the display period and a driving electrode for the touch period in a time division way.

For example, in the driving method provided by at least one embodiment of the present disclosure, a common electrode signal is applied to the first electrode in the display period, and a touch scanning signal is applied to the first electrode in the touch period, the touch sensing electrode couples a voltage signal of the touch scanning signal and outputs a signal.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
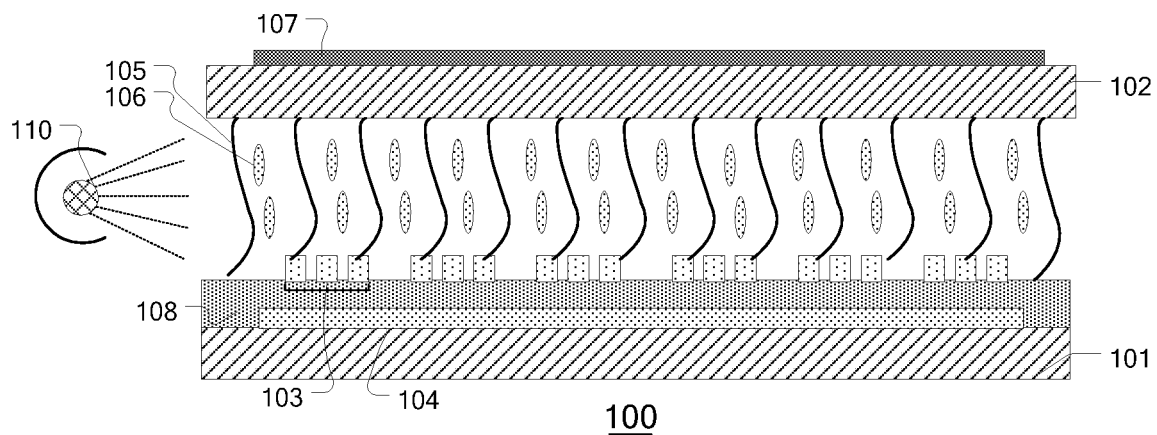
FIG. 1 is a cross-sectional structural schematic diagram of a touch display screen provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In general, a polarizer is disposed in a display panel. Light emitted by a backlight source is incident onto the display panel through the polarizer, and emitted out from the display panel through the polarizer again, so that the polarizer converts natural light to linearly polarized light; however, the polarizer may decrease light transmissivity greatly, thus affecting display effect of the display panel. If a touch sensing electrode is further disposed on the display panel where the polarizer has been disposed, a demand for current touch display may not be satisfied because the light transmissivity is further decreased.

At least one embodiment of the present disclosure provides a touch display screen, and the touch display screen comprises: a first substrate and a second substrate disposed opposite to each other; a first electrode and a second electrode disposed between the first substrate and the second substrate, and capable of generating a horizontal electric field in a power-on state; liquid crystal filled between the first substrate and the second substrate; and a touch sensing electrode disposed on an outer side or an inner side of the second substrate. The liquid crystal includes nematic liquid crystal and long-chain compound which are dispersed in the nematic liquid crystal and may cause the nematic liquid crystal to form a scattering state.

The embodiments of the present disclosure make use of structural characteristic of optical waveguide, to apply an optical waveguide structure in display technology. A light source incident from a side surface of a liquid crystal cell is used to irradiate the liquid crystal cell, so that light is incident and emergent in a direction parallel to the first substrate and the second substrate. The optical waveguide is a structure consisting of transparent mediums for transmitting light wave, on an interface of the mediums having different refractive indices, due to total reflection phenomenon light wave is limited in a limited region of the optical waveguide for propagating.

The optical waveguide structure in the present disclosure comprises a liquid crystal layer and a transparent substrate (e.g., a glass substrate, a plastic substrate) which have different refractive indices, wherein, the refractive index of the liquid crystal layer is greater than the refractive index of the transparent substrate. The optical waveguide structure may make light propagate in a predetermined direction.

The touch display panel in an embodiment of the present disclosure improves the light transmissivity based on a structure of the optical waveguide, and meanwhile utilizes long-chain compounds to make a part of liquid crystal molecules in a scattering state in a powered state, so that an incident angle of the light propagated in the optical waveguide is changed, a condition of total reflection between the liquid crystal and the substrate are destroyed, the light may be emergent from a corresponding position, so as to achieve a display function, a polarizer is no longer required here for achieving the display function, and a structure of the polarizer may be saved in the touch display screen, and thus light transmissivity and utilization efficiency of light are improved. And a touch sensing electrode is disposed on an outer side or an inner side of the second substrate, so as to have both display function and touch function.

An embodiment of the present disclosure provides a touch display screen, and FIG. 1 is a cross-sectional structural schematic diagram of a touch display screen. As shown in FIG. 1, the touch display screen 100 comprises: a first substrate 101 and a second substrate 102 disposed opposite to each other, a first electrode 103 and a second electrode 104 disposed between the first substrate 101 and the second substrate 102, liquid crystal 106 filled between the first substrate 101 and the second substrate 102, and a touch sensing electrode 107 disposed on an outer side or an inner side of the second substrate 102. A horizontal electric field may be generated between the first substrate 101 and the second substrate 102 in a power-on state, so as to drive the liquid crystal 106. The liquid crystal 106 includes nematic liquid crystal and long-chain compounds 105 dispersed in the nematic liquid crystal which may cause the nematic liquid crystal to form a scattering state.

For example, the first substrate 101 and the second substrate 102 are transparent glass substrates, plastic substrates or the like, and a circuit for controlling or driving the first electrode 103 and the second electrode 104 may be formed thereon, respectively. For example, the glass substrate and the plastic substrate have a refractive index of 1.0 to 1.2.

For example, in the embodiment, the first electrode 103 is slit-shaped electrode, and the second electrode 104 is slit-shaped electrode or plate-shaped electrode, wherein, the slit-shaped electrode includes a plurality of sub-electrodes which are spaced apart from each other and arranged in parallel. The first electrode 103 and the second electrode 104 are connected with a control circuit, and the control circuit may apply a positive voltage on the first electrode 103, a negative voltage on the second electrode 104 or ground the second electrode 104, so as to form an electric field in a region corresponding to the first electrode 103 and the second electrode 104, and for example, a horizontal electric field is formed to drive liquid crystal molecules to rotate in the horizontal direction. According to different designs, the plurality of sub-electrodes in the slit-shaped electrode may be uniformly applied with a voltage, or may be individually applied with a voltage, for example, the voltage is gradually increased or decreased, thereby forming a gradually changing electric field.

For example, alignment layers may further be formed on the first substrate 101 and the second substrate 102, and the alignment layers are in contact with the liquid crystal 106; therefore, the liquid crystal molecules may be aligned by the alignment layers, and the alignment layers may be made of, for example, polyimide (PI). For example, aligning directions of the alignment layers on the first substrate 101 and the second substrate 102 are opposite to each other, so as to form an antiparallel aligning structure.

For example, a process of forming the alignment layer includes: coating aligning solution on the first substrate 101 and the second substrate 102 respectively, after the aligning solution is cured, performing a rubbing and aligning process or performing a photocuring and aligning process. The alignment layers are conducive to deflecting the liquid crystal molecules under an action of an electric field.

According to a display mode, the liquid crystal display panel may be divided into a Twisted Nematic (TN) type, an In Plane Switching (IPS) type and an Advanced Super Dimension Switch (ADS) type and so on. A common electrode and a pixel electrode for providing a voltage to drive liquid crystal to be deflected in ADS type and IPS type liquid crystal display devices are both disposed on a first substrate, commonly referred to as a horizontal electric field type. In a TN type liquid crystal display device, a pixel electrode is disposed on a first substrate and a common electrode is disposed on a second substrate, commonly referred to as a vertical electric field type. As shown in FIG. 1, the first electrode 103 is a common electrode, the second electrode 104 is a pixel electrode, and deflections of the liquid crystal molecules are controlled by an electric field generated between the common electrode and the pixel electrode.

The embodiment is described in detail by taking an example of a liquid crystal display device of an Advanced Super Dimension Switch (ADS) type. In the liquid crystal touch display screen of the ADS type, a multi-dimensional electric field is formed through an electric field generated by edges of slit-shaped electrodes in a same plane and an electric field generated between a slit-shaped electrode layer and a plate-shaped electrode layer, so that all aligned liquid crystal molecules between the slit-shaped electrodes and right above the electrodes in a liquid crystal cell may be rotated, thereby improving work efficiency of the liquid crystal and increasing light transmitting efficiency. An Advanced Super Dimension Switch technology may improve image quality of a liquid crystal display device, and the Advanced Super Dimension Switch technology has advantages such as high resolution, high transmissivity, low power consumption, wide viewing angle, high aperture ratio, low color difference and so on.

For example, as shown in FIG. 1, in the touch display screen 100 provided by the embodiment, long chains of long chain compounds 105 are perpendicular to the first substrate 101, that is, directions of the long chains of the long chain compounds 105 are same as arranging directions of the liquid crystal 106 without electricity.

It should be noted that, as shown in FIG. 1, the liquid crystal molecules themselves do not emit light, and a light source 110 incident from a side surface is disposed in a direction close to the liquid crystal molecules and parallel to the first substrate in the touch display screen, and the light source includes, for example, light strips of a plurality of light emitting diodes (LED) or cold cathode fluorescent light (CCFL). The liquid crystal layer itself is in a transparent state under a case that an electric field is not formed by not applying power on the first electrode 103 and the second electrode 104, and a transmissivity of light propagating in the liquid crystal layer may be up to 90% or more, however, due to total reflection, the light may not be emergent from surfaces of the first substrate and the second substrate. In a condition of power-on, due to the long-chain compounds, the liquid crystal molecules show a scattering state, an incident angle of the light incident from the liquid crystal layer to the first substrate or the second substrate is changed, conditions of total reflection of light are destroyed, a part of the light may be emergent at an angle formed between the light and the first substrate or the second substrate in a corresponding region where the electric field has been applied, so that a display function with high transparency may be realized. Moreover, the display function is realized without using two polarizers used in conventional liquid crystal display device, thereby avoiding a problem of decreasing the light transmissivity caused by using the polarizer, and thus display brightness is improved and energy consumption is reduced.

For example, the first substrate 101 and the second substrate 102 are connected with each other by a sealant to form a liquid crystal cell. The sealant is made of a transparent material, and light may be incident into the liquid crystal layer through the sealant.

For example, monomers and photoinitiators which are required for forming the long-chain compounds may be mixed in the liquid crystal, and the long-chain compounds are formed by polymerizing a plurality of corresponding monomers under an irradiation of ultraviolet ray and under an action of the photoinitiators.

For example, the monomers required for forming the long chain compounds include any one or combination of 4,4'-bis[6-(acryloyloxy)hexyloxy]biphenyl, 2-methy-1,4-bis[4-(3-(acryloyloxy)hexyloxy)benzoyloxy]hydroquinone, 2-methyl-1,4-bis[4-(3-acryloyloxy)propoxy)benzoyloxy]hydroquinone, corresponding chemical formulas are as follows:

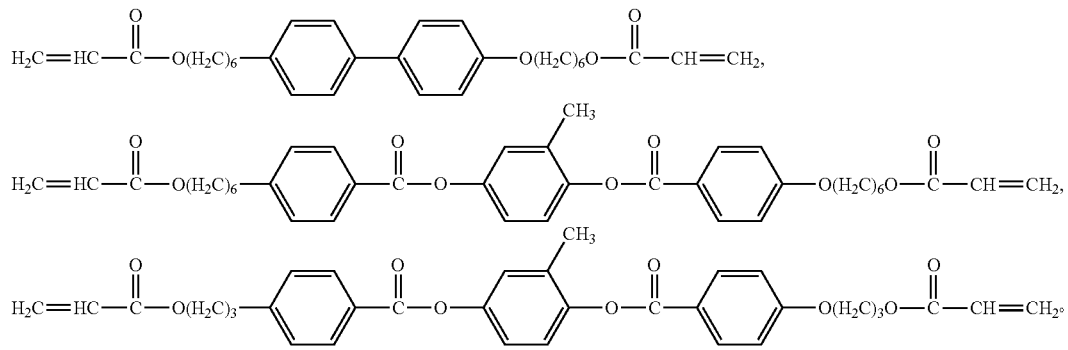

For example, the corresponding long chain compounds formed by the above monomers include any one or combination of poly-4,4'-bis[6-(acryloyloxy)hexyloxy]biphenyl, poly-2-methy-1,4-bis[4-(3-(acryloyloxy)hexyloxy)benzoyloxy]hydroquinone, poly-2-methyl-1,4-bis[4-(3-acryloyloxy)propoxy)benzoyloxy]hydroquinone, corresponding chemical formulas are as follows:

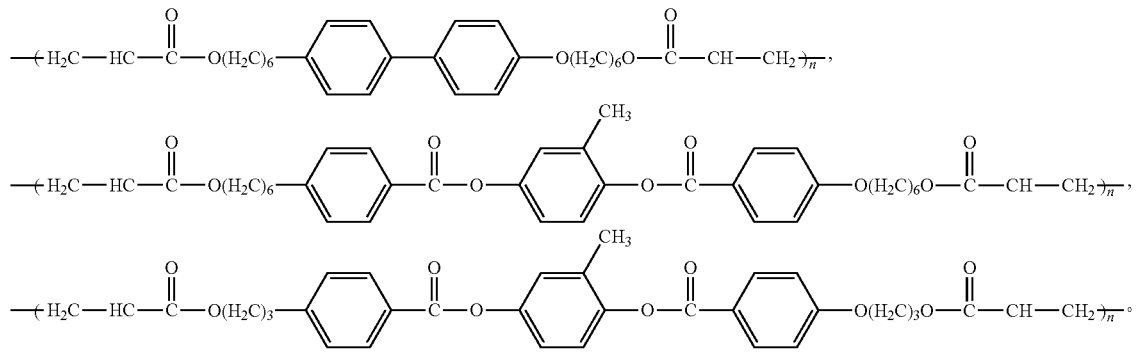

For example, a degree of polymerization n of the long-chain compound described above is 10 to 18.

For example, in the embodiment, the nematic liquid crystal refers to the liquid crystal in the nematic phase. The nematic liquid crystal molecules are rod-shaped, may move in a three-dimensional range, and have obvious electrical anisotropy, so that arrangement and alignment of the molecules thereof may be changed by using an external electric field, thereby changing an optical property of the liquid crystal. For example, twisted nematic (TN) liquid crystal is twisted in natural state, when a current is applied to the liquid crystal, they will be reversely twisted to a corresponding angle according to a magnitude of the applied voltage. In the embodiment, the used nematic liquid crystal, for example, is a positive liquid crystal ($\Delta\epsilon>0$) and has a refractive index of 1.6 to 1.8 (e.g., 1.7). For example, the nematic liquid crystal includes any one or a combination of liquid crystal molecules as follows:

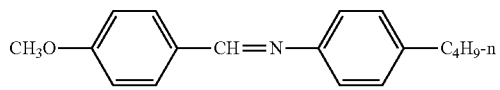

-continued

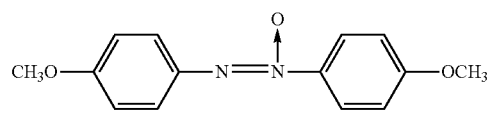

-continued

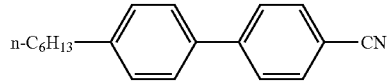
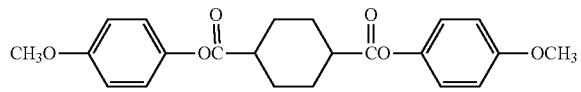
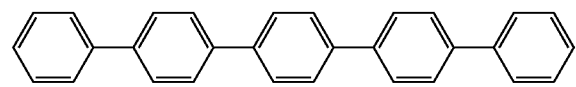

For example, in a mixture comprising liquid crystal molecules, monomers and photoinitiators, a mass percentage of the monomers is 1% to 5% and a mass percentage of the photoinitiators is 0.5% to 3%.

For example, in the touch display screen provided in the embodiment, the first electrode 103, the second electrode 104 and a touch sensing electrode 107 may be formed by photolithography, and these electrodes are made of a transparent conductive material such as indium tin oxide (ITO), indium zinc oxide (IZO) and the like.

For example, as shown in FIG. 1, the first electrode 103 and the second electrode 104 are both disposed on an upper surface of the first substrate 101, and the upper surface of the first substrate 101 refers to a surface of a side of the first substrate 101 close to the liquid crystal. An insulating layer 108 is disposed between the first electrode 103 and the second electrode 104, so as to electrically isolate the first electrode 103 from the second electrode 104.

For example, the insulating layer 108 is made of a transparent insulating material such as silicon oxide, silicon nitride, hafnium oxide, silicon oxynitride or aluminum oxide, and structure and forming process of the insulating layer may be referred to conventional designs and processes, which will not be repeated herein.

Figure 2:
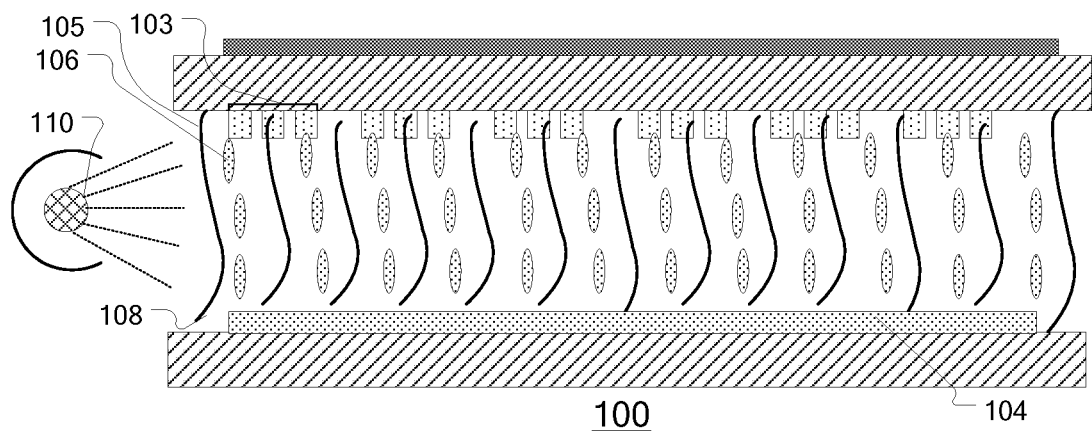
FIG. 2 is a cross-sectional structural schematic diagram of a touch display screen provided by another embodiment of the present disclosure.

The first electrode and the second electrode may also be separately disposed on different substrates, and for example, FIG. 2 is a cross-sectional structural schematic diagram of a touch display screen provided by another embodiment of the present disclosure. As shown in FIG. 2, a first electrode 103 and a second electrode 104 are separately disposed on a first substrate 101 and a second substrate 102, the first electrode 103 is disposed on an upper surface of the first substrate 101, the second electrode 104 is disposed on an lower surface of the second substrate 102, the upper surface of the first substrate 101 refers to a surface of a side of the first substrate 101 close to the liquid crystal, and the lower surface of the second substrate 102 refers to a surface of a side of the second substrate 102 close to the liquid crystal. Similarly, the first electrode 103 is slit-shaped, and the second electrode 104 is slit-shaped or plate-shaped, wherein, the slit-shaped electrode includes a plurality of sub-electrodes which are spaced apart from each other and arranged in parallel.

For example, the touch display screen comprises a display driving circuit and a touch driving circuit, and in general, the add on mode touch screen may additionally add a touch driving electrode and a touch sensing electrode on an upper surface of an upper substrate of the display panel to implement a touch function. For example, strip-shaped indium tin oxide (ITO) electrodes which are located on different layers and intersected with each other are fabricated on a surface of a thin film transistor array substrate, and the two layers of strip-shaped ITO electrodes may be served as a touch driving electrode and a touch driving electrode for realizing the touch function, respectively. For example, as shown in FIG. 1 and FIG. 2, the first electrode 103 may be used as a touch driving electrode, in a first time period, the first electrode 103 is electrically connected with a display driving circuit to be used as a common electrode for realizing a display function, and in a second time period, the first electrode 103 is electrically connected with a touch driving circuit to be used as a touch driving electrode for realizing the touch function. In this way, process steps may be reduced, an electrode material may be saved, and production cost may be reduced. FIG. 1 and FIG. 2 are cross-sectional views in an extending direction of an electrode strip of the touch sensing electrode 107, so that the touch sensing electrodes 107 therein are shown in a strip shape.

Figure 3:
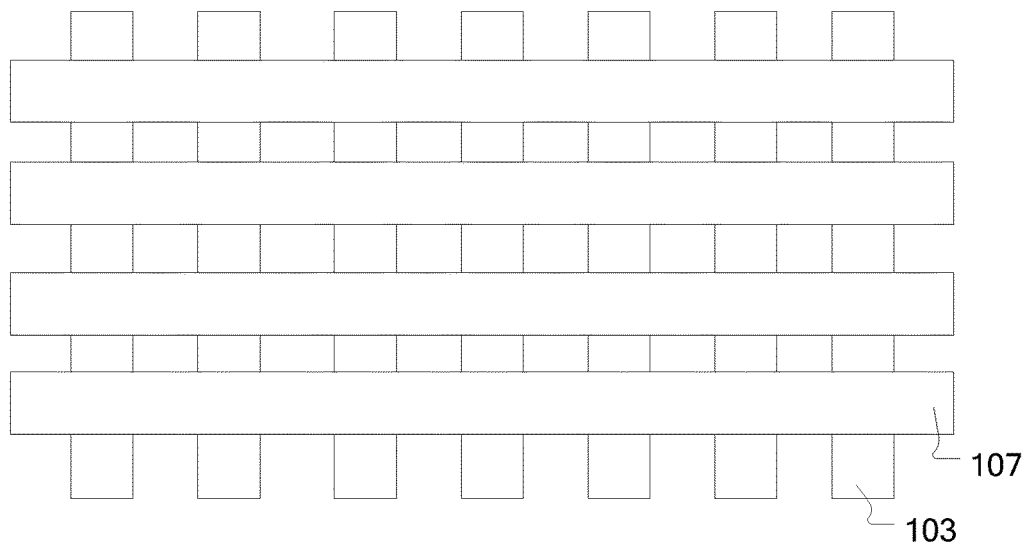
FIG. 3 is s a plane schematic diagram of a common electrode and a touch sensing electrode provided by an embodiment of the present disclosure.

For example, as shown in FIG. 3, orthogonal projections of the first electrode 103 and the touch sensing electrode 107 on the first substrate 101 at least partially overlap with each other, so that an extending direction of an electrode strip of the first electrode 103 is different from that of an electrode strip of the touch sensing electrode 107, an intersecting region is formed therebetween, and a capacitance is formed in the intersecting region.

Further, as shown in FIG. 3, the first electrode (the touch driving electrode) and the touch sensing electrode are arranged in intersection horizontally and vertically, and the first electrode 103 and the touch sensing electrode 107 are disposed perpendicular to each other, so that a size of each intersecting region is nearly the same, and a size of the capacitance formed at the intersecting region is also approximately the same, and in this way a matrix of capacitances is formed at the intersections. Then, touch scanning signals are respectively applied to each row of the first electrodes (the touch driving electrodes), and output signals of the touch sensing electrodes corresponding to each row of the touch driving electrodes are sequentially detected, so as to detect change of the capacitance in the matrix of capacitances for determining a touch position.

For example, a driving signal line and a sensing signal line are further disposed on the first substrate or the second substrate, the touch sensing electrode is connected with the sensing signal line, and the first electrode served as a touch driving electrode is connected with the driving signal line. The sensing signal line and the touch sensing electrode may be located in different layers or a same layer, and when the sensing signal line and the touch sensing electrode are located in different layers, the touch sensing electrode is connected with the sensing signal line through a via hole located in an insulating layer therebetween; and when the sensing signal line and the touch sensing electrode are in a same layer, the two are directly connected with each other.

Figure 4:
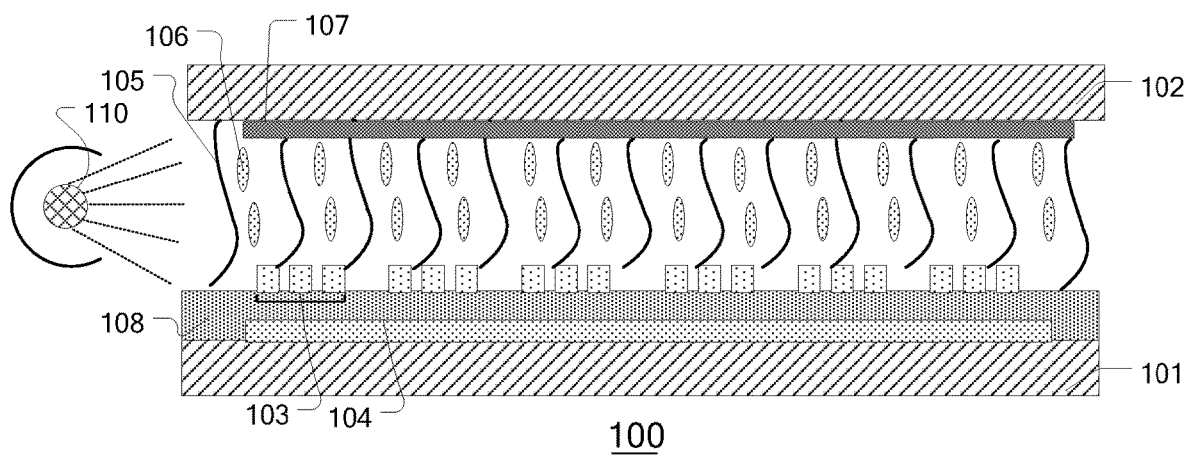
FIG. 4 is a cross-sectional structural schematic diagram of a touch display screen provided by still another embodiment of the present disclosure.

For example, as shown in FIG. 1 and FIG. 2, the touch sensing electrode 107 is disposed on an upper surface of the second substrate 102. As shown in FIG. 4, the touch sensing electrode 107 may also be disposed on a lower surface of the second substrate 102, thereby forming an in cell touch display screen. By embedding the touch control electrode in inside of the display screen, the in cell capacitive touch display screen can reduce a thickness of a module, and reduce production cost of the touch screen greatly, which is more and more widely used in a touch display technology.

Figure 5:
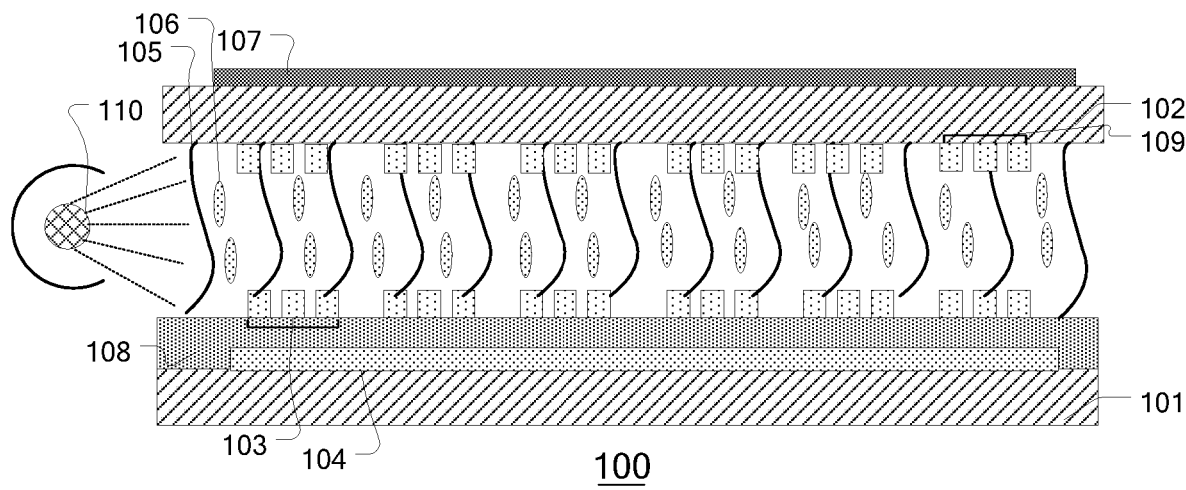
FIG. 5 is a cross-sectional structural schematic diagram of a touch display screen provided by yet another embodiment of the present disclosure.

An embodiment of the present disclosure provides a touch display screen, as shown in FIG. 5, the touch display screen further comprises a third electrode 109, and the third electrode 109 is a driving electrode for touching. The third electrode 109 includes a plurality of electrode strips, extending directions of the electrode strips of the third electrode 109 are different from (for example, perpendicular to) extending directions of the electrode strips of the touch sensing electrode 107, and orthographic projections of the two on the first substrate 101 at least partially overlap with each other.

In the embodiment, a transparent electrode is added to serve as a touch driving electrode, so that it is not necessary to multiplex the second electrode 104 as a touch driving electrode in a touch period and a common electrode in a display period in a time division way.

An embodiment of the present disclosure provides a display device, and the display device comprises any touch screen described above. The display device may be any product or component having a display function and a touch function, such as a mobile phone, a tablet computer, a notebook computer, a digital photo frame, a navigator and the like.

For example, in the display device, a light source is an edge type light source, and the light source incident from a side surface of a liquid crystal cell is used to irradiate the liquid crystal cell, so that light is incident and emergent in a direction parallel to the first substrate and the second substrate.

Figure 6:
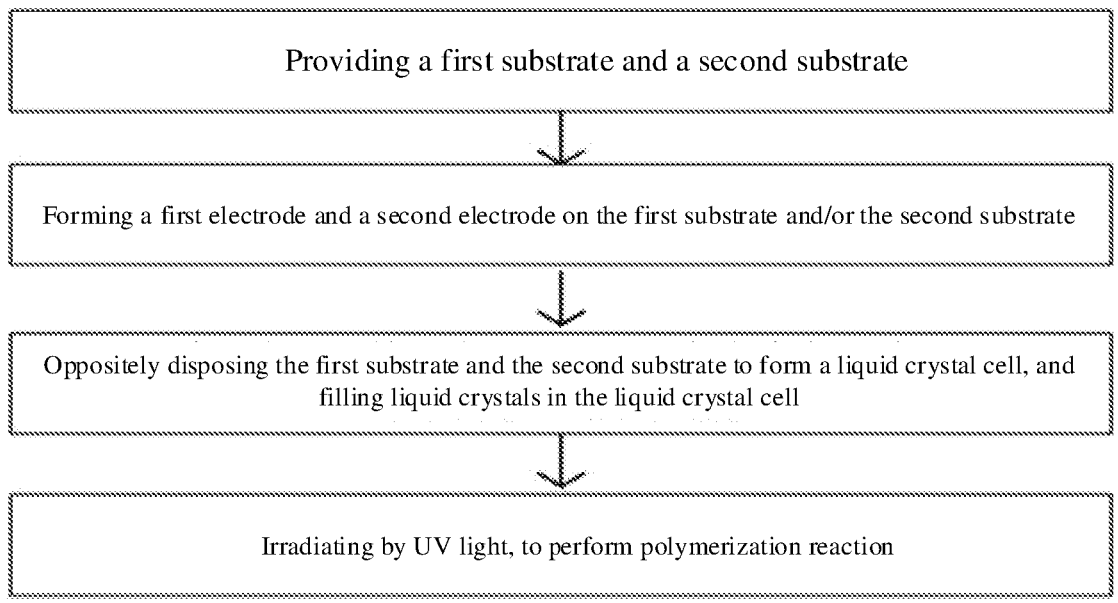
FIG. 6 is a flowchart of a manufacturing method of a touch display screen provided by an embodiment of the present disclosure.

An embodiment of the present disclosure provides a manufacturing method of a touch display screen, and as shown in FIG. 6, FIG. 6 is a flowchart of a manufacturing method of a touch display screen of the embodiment. The manufacturing method comprises: providing a first substrate and a second substrate; forming a first electrode and a second electrode on the first substrate and/or the second substrate; oppositely disposing the first substrate and the second substrate to form a liquid crystal cell, and filling liquid crystal in the liquid crystal cell, the liquid crystal including nematic liquid crystal and monomers dispersed in the nematic liquid crystal; irradiating the liquid crystal by using UV light, to form long chain compounds by polymerizing the monomers.

For forming a first electrode and a second electrode on the first substrate and/or the second substrate, in one example, both the first electrode and the second electrode are formed on the first substrate, and the two are formed on a same layer but insulated from each other for insulation, or the two are formed on different layers and spaced apart from each other for insulation. In another example, the first electrode and the second electrode are formed on the first substrate and the second substrate, respectively.

For example, the first substrate and the second substrate are transparent glass substrates or plastic substrates, and circuits for controlling or driving the first electrode and the second electrode are respectively formed on the first substrate or the second substrate.

For example, a refractive index $n_1$ of the liquid crystal is greater than a refractive index $n_2$ of the transparent glass substrate or the plastic substrate, when an incident angle of light is greater than or equal to $\arcsin (n_2/n_1)$, the light is totally reflected between the first substrate and the second substrate in the liquid crystal molecules. For example, the refractive index $n_1$ of the liquid crystal is 1.6 to 1.8, and the refractive index $n_2$ of the glass substrate or the plastic substrate is 1.0 to 1.2.

For example, an alignment layer may be further formed on surfaces of the first substrate and the second substrate facing the liquid crystal layer to align liquid crystal molecules, the alignment layers may be made of, for example, polyimide (PI), and aligning directions of the alignment layers disposed on the first substrate and the second substrate are opposite to each other, so as to form a structure of anti-parallel alignment.

For example, processes of forming the alignment layers include: coating aligning solution on the first substrate and the second substrate respectively, after the aligning solution is cured, performing a rubbing and aligning process or performing a photocuring and aligning process. The alignment layers are conducive to deflecting the liquid crystal molecules in the liquid crystal layer under an action of an electric field.

For example, the manufacturing method of the touch display screen further comprises forming a touch sensing electrode on an outer side or an inner side of the second substrate. For example, the touch sensing electrode may be disposed on an upper surface of the second substrate, and may also be disposed on a lower surface of the second substrate, thereby forming an in cell touch display screen. By embedding the touch control electrode in inside of the display screen, the in cell capacitive touch display screen can reduce a thickness of a module, and reduce production cost of the touch screen greatly, which is more and more widely used in a touch display technology.

For example, long chains of the long chain compounds may be perpendicular to the first substrate, that is, directions of the long chains of the long chain compounds are same as arranging directions of the liquid crystal molecules without electricity.

For example, the liquid crystal molecules are sealed in a region defined by the first substrate and the second substrate, a sealant used here is made of a transparent material, and light may be incident into the liquid crystal layer through the sealant. A process of sealing the liquid crystal in the region defined by the first substrate and the second substrate is completed in vacuum.

In forming the liquid crystal cell, for example, the first substrate and the second substrate are sealed by a transparent sealant at first, a certain region is reserved for injecting a mixture including the liquid crystal, the monomers and the photoinitiators, and the reserved region is sealed after injecting the mixture into the region defined by the first substrate and the second substrate, and then the mixture is irradiated by ultraviolet light, the monomers are polymerized to form long chain compounds under UV light irradiation and action of the photoinitiators, and long chains of the long chain compounds are perpendicular to the first substrate. Alternatively, a sealant is coated on the first substrate or the second substrate to define a region for receiving the liquid crystal at first, and then liquid crystal material is dropped, and then the second substrate or the first substrate is covered on the first substrate or the second substrate which is coated by the sealant, so as to obtain a liquid crystal cell filled with the liquid crystal material.

For example, the monomers required for forming the long chain compounds include any one or combination of 4,4'-bis[6-(acryloyloxy)hexyloxy]biphenyl, 2-methy-1,4-bis[4-(3-(acryloyloxy)hexyloxy)benzoyloxy]hydroquinone, 2-methyl-1,4-bis[4-(3-acryloyloxy)propoxy)benzoyloxy]hydroquinone, corresponding chemical formulas are as follows:

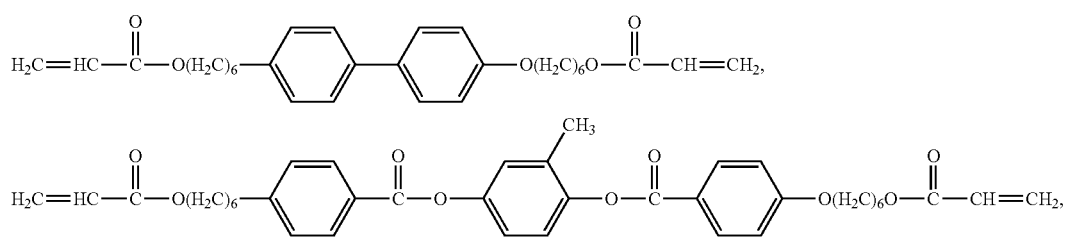

-continued

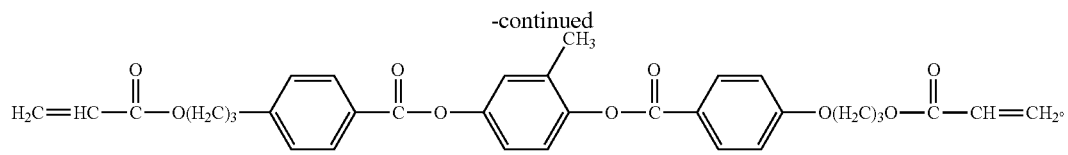

For example, the corresponding long chain compounds formed by the above monomers include any one or combination of poly-4,4'-bis[6-(acryloyloxy)hexyloxy]biphenyl, poly-2-methy-1,4-bis[4-(3-(acryloyloxy)hexyloxy)benzoyloxy]hydroquinone, poly-2-methyl-1,4-bis[4-(3-acryloyloxy)propoxy)benzoyloxy]hydroquinone, corresponding chemical formulas are as follows:

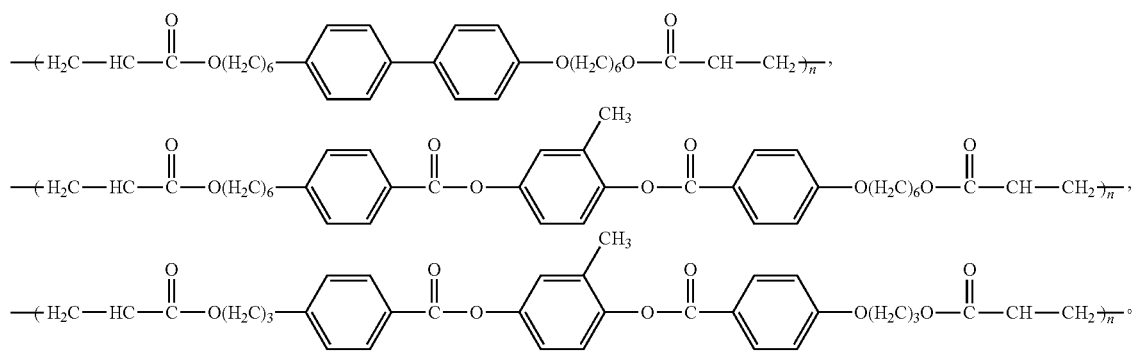

For example, a degree of polymerization n of the long-chain compounds described above is 10 to 18.

For example, the liquid crystal includes any one or a combination of liquid crystal molecules as follows:

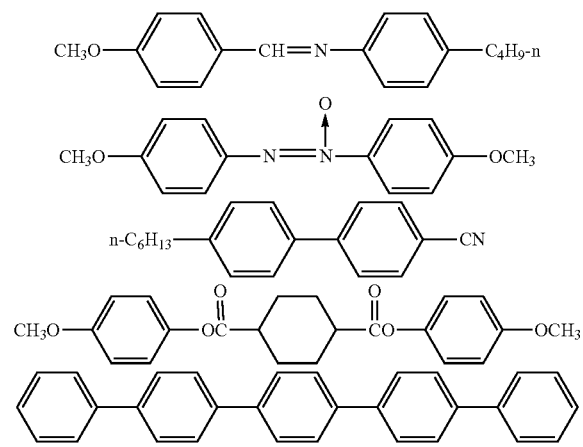

For example, in a mixture including liquid crystal molecules, monomers and photoinitiators, a mass percentage of the monomers are 1% to 5% and a mass percentage of the photoinitiators are 0.5% to 3%.

For example, the first electrode, the second electrode and the touch sensing electrode may be formed by photolithography, and these electrodes are made of a transparent conductive material such as indium tin oxide (ITO), indium zinc oxide (IZO) and the like.

For example, in one example, a first electrode, an insulating layer and a second electrode are formed on an upper surface of the first substrate sequentially, and the first electrode and the second electrode are electrically isolated by the insulating layer, the first electrode is multiplexed to a common electrode in a display period and a touch driving electrode in a touch period in a time division way, and the touch sensing electrode is formed on an outer side or an inner side of the second substrate.

For example, the insulating layer is made of a transparent insulating material such as silicon oxide, silicon nitride, hafnium oxide, silicon oxynitride or aluminum oxide.

For example, in another example, a first electrode is formed on an upper surface of the first substrate and a second electrode is formed on a lower surface of the second substrate. The first electrode is slit-shaped, and the second electrode is slit-shaped or plate-shaped, wherein, the slit-shaped electrode includes a plurality of sub-electrodes which are spaced apart from each other and arranged in parallel. Similarly, the first electrode is multiplexed to a common electrode in a display period and a touch driving electrode in a touch period in a time division way, and the touch sensing electrode is formed on an outer side or an inner side of the second substrate.

For example, based on the substrates and the electrode structures described in the above two examples, the manufacturing method further comprises forming a third electrode on a lower surface of the second substrate, and the third electrode is a driving electrode for touching, orthogonal projections of the third electrode and the touch sensing electrode on the first substrate at least partially overlap with each other. An electrode is additionally added for serving as a touch driving electrode, so that the first electrode may not be multiplexed to a touch driving electrode in a time division way.

An embodiment of the present disclosure provides a driving method of a touch display screen, for the touch display screen where the first electrode may be multiplexed in a time division way. The driving method comprises: dividing a display time of one frame image of the touch display screen into a display period and a touch period, wherein, the first electrode is multiplexed to a common electrode in the display period and a driving electrode in the touch period in the time division way.

For example, a common electrode signal is applied to the first electrode in the display period and meanwhile a non-working signal is applied to the touch sensing electrode or the touch sensing electrode is grounded or dangled; a touch scanning signal is applied to the first electrode in the touch period, and the touch sensing electrode couples a voltage signal of the touch scan signal and outputs it.

For example, the display and touch functions are realized by driving the first electrode in a time division way, the first electrode (e.g., the common electrode) is charged in the display period, the second electrode (e.g., the pixel electrode) maintains a DC/AC voltage, a low level signal is applied to the touch sensing electrode, and a storage capacitance is provided between the first electrode and the second electrode to maintain a constant voltage difference; in the touch period, the first electrode serves as a touch driving electrode, a touch scanning signal is applied to the first electrode, and the touch sensing electrode couples a voltage signal of the touch scanning signal and outputs it.

It should be noted that, when the first electrode is subjected to a high-frequency scanning in which the frequency and voltage are different from these of the display period, the voltage of the first electrode changes and the voltage on the second electrode also changes accordingly, so as to keep the voltage difference between the first electrode and the second electrode.

When the touch display screen is operated, a voltage is applied to the first electrode and the second electrode for driving the liquid crystal molecules to be deflected, so as to display an image. When a finger, a touch pen or the like touches the touch display screen, an electric field formed between the first electrode and the second electrode is changed, so that a sensing touch is occurred, and a purpose of touch is achieved, and a touch position is determined according to change of mutual capacitance formed by the touch sensing electrode and the first electrode (for example, the touch driving electrode).

For example, the first electrode (e.g., the touch driving electrode) and the touch sensing electrode are arranged in intersection horizontally and vertically, and a matrix of capacitances is formed at the intersections, and then touch scanning signals are respectively applied to each row of the first electrodes (the touch driving electrodes), and output signals of the touch sensing electrodes corresponding to each row of the touch driving electrodes are sequentially detected, so as to detect change of the capacitance in the matrix of capacitances for determining a touch position.

An embodiment of the present disclosure provides a touch display screen and a manufacturing method thereof, a display device and a driving method, which has at least one of beneficial effects as follows:

(1) Based on an optical waveguide structure, a polarizer is omitted, and light transmissivity is improved.

(2) By destroying conditions of total reflection of light through long-chain compounds, the liquid crystal molecules are in a scattering state to realize a display function.

(3) The first electrode is multiplexed to a common electrode for displaying and a driving electrode for touching in a time division way, which may save electrode material.

(4) The touch sensing electrode is disposed on a display screen having high transmissivity, so that the touch display screen may realize display and touch functions.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

What are described above is related to the specific embodiments of the disclosure only and not limitative to the scope of the disclosure. The protection scope of the disclosure shall be based on the protection scope of the claims.

The application claims priority to the Chinese patent application No. 201610565811.5, filed Jul. 18, 2016, the disclosure of which is incorporated herein by reference as part of the application.

The invention claimed is:

1. A touch display screen, comprising: a first substrate and a second substrate, disposed opposite to each other; a first electrode and a second electrode, disposed between the first substrate and the second substrate, and configured to generate a horizontal electric field in a power-on state;

liquid crystal, filled between the first substrate and the second substrate, including nematic liquid crystal and long-chain compounds which are dispersed in the nematic liquid crystal and cause the nematic liquid crystal to form a scattering state; and a touch sensing electrode, disposed on an outer side or an inner side of the second substrate, wherein, each long-chain compound includes a plurality of monomers, the plurality of monomers including any one or a combination of:

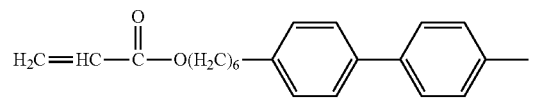

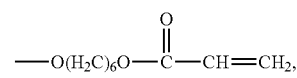

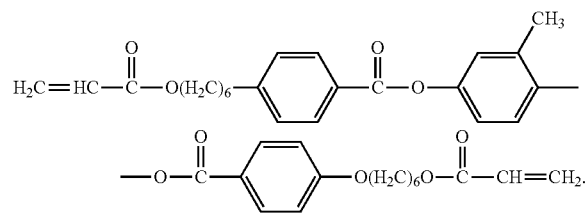

2. The touch display screen according to claim 1, wherein, long chains of the long-chain compounds are perpendicular to the first substrate.

3. The touch display screen according to claim 1, wherein, each long-chain compound includes any one or a combination of:

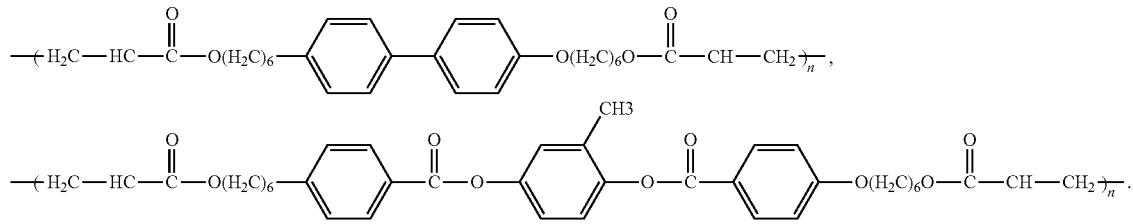

4. The touch display screen according to claim 1, wherein, the nematic liquid crystal is positive liquid crystal.

5. The touch display screen according to claim 4, wherein, the nematic liquid crystal includes any one or a combination of liquid crystal molecules as follows:

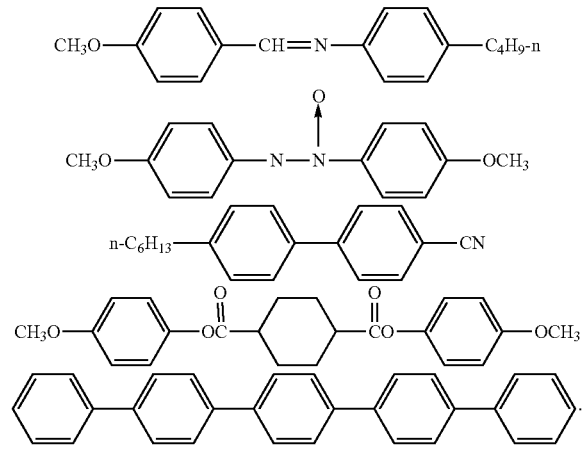

6. The touch display screen according to claim 1, wherein, the first electrode, the second electrode, and the touch sensing electrode are all made of a transparent conductive material.

7. The touch display screen according to claim 6, wherein, the first electrode is slit-shaped and the second electrode is slit-shaped or plate-shaped.

8. The touch display screen according to claim 6, wherein, under a case that the first electrode and the second electrode are disposed on a same substrate, an insulating layer is disposed between the first electrode and the second electrode.

9. The touch display screen according to claim 8, wherein, the first electrode and the second electrode are both disposed on an upper surface of the first substrate.

10. The touch display screen according to claim 7, wherein, the first electrode is disposed on an upper surface of the first substrate and the second electrode is disposed on a lower surface of the second substrate.

11. The touch display screen according to claim 1, further comprising a display driving circuit and a touch driving circuit, the first electrode being electrically connected with the display driving circuit in a first time period, and electrically connected with the touch driving circuit in a second time period.

12. The touch display screen according to claim 11, wherein, orthogonal projections of the first electrode and the touch sensing electrode on the second substrate at least partially overlap with each other.

13. The touch display screen according to claim 12, wherein, the first electrode and the touch sensing electrode are disposed perpendicular to each other.

14. The touch display screen according to claim 1, further comprising a third electrode, wherein, the third electrode is a driving electrode for touching, and wherein orthogonal projections of the third electrode and the touch sensing electrode on the first substrate at least partially overlap with each other.

15. A display device, comprising the touch display screen according to claim 1.

16. A manufacturing method of a touch display screen, comprising:
  providing a first substrate and a second substrate;
  forming a first electrode and a second electrode on the first substrate and/or the second substrate;
  oppositely disposing the first substrate and the second substrate to form a liquid crystal cell, and filling liquid crystal in the liquid crystal cell, the liquid crystal including nematic liquid crystal and monomers dispersed in the nematic liquid crystal; and
  forming long chain compounds by polymerizing the monomers,
  wherein, each long chain compound includes a plurality of the monomers, the plurality of the monomers including any one or a combination of:

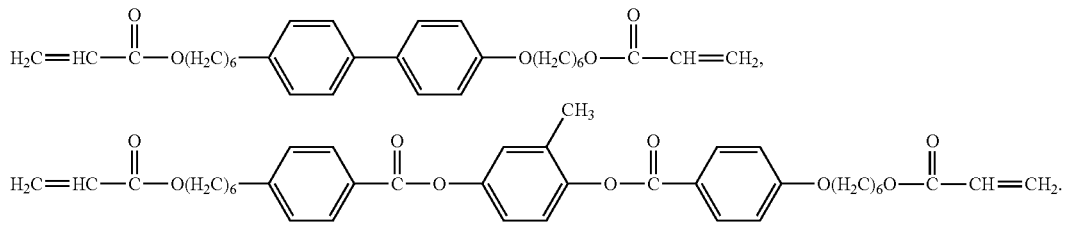

17. The manufacturing method according to claim 16, further comprising: forming a third electrode on a lower surface of the second substrate, wherein, the third electrode is a driving electrode for touching, and wherein orthogonal projections of the third electrode and the touch sensing electrode on the second substrate at least partially overlap with each other.

18. A driving method of the touch display screen according to claim 1, comprising: dividing a display time of one frame image of the touch display screen into a display period and a touch period, wherein, the first electrode is multiplexed to a common electrode for the display period and to a driving electrode for the touch period in a time division way.

19. The driving method according to claim 18, wherein, a common electrode signal is applied to the first electrode in the display period, and a touch scanning signal is applied to the first electrode in the touch period, the touch sensing electrode couples a voltage signal of the touch scanning signal and outputs a signal.

* * * * *